(12) United States Patent
Angelova et al.

(10) Patent No.: US 11,188,603 B2
(45) Date of Patent: *Nov. 30, 2021

(54) ANNOTATION OF VIDEOS USING AGGREGATED USER SESSION DATA

(71) Applicant: GOOGLE LLC, Mountain View, CA (US)

(72) Inventors: Ralitsa Lyudmilova Angelova, Zurich (CH); Jean-Yves Delort, Zurich (CH); Pete Richard Lidwell, Zurich (CH); Emanuel Taropa, San Jose, CA (US); Yaxin Liu, San Jose, CA (US); Tomasz Kaftal, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/586,634

(22) Filed: Sep. 27, 2019

(65) Prior Publication Data

US 2020/0026740 A1 Jan. 23, 2020

Related U.S. Application Data

(63) Continuation of application No. 15/171,779, filed on Jun. 2, 2016, now Pat. No. 10,430,476.

(Continued)

(51) Int. Cl.
*G06F 16/9535* (2019.01)
*G06F 16/435* (2019.01)
(Continued)

(52) U.S. Cl.
CPC ........ *G06F 16/9535* (2019.01); *G06F 16/435* (2019.01); *G06Q 30/0277* (2013.01); *H04L 43/18* (2013.01)

(58) Field of Classification Search
CPC .............. G06F 16/9535; G06F 16/435; G06Q 30/0277; H04L 43/18
See application file for complete search history.

(56) References Cited

U.S. PATENT DOCUMENTS 8,825,638 B1  9/2014 Yi et al.
9,152,708 B1  10/2015 He et al.
(Continued)

FOREIGN PATENT DOCUMENTS

CN          104063454        9/2014

OTHER PUBLICATIONS

Examination Report for EP Appln. Ser. No. 16836217.6 dated Feb. 26, 2020 (9 pages).

(Continued)

*Primary Examiner* — Jay A Morrison
(74) *Attorney, Agent, or Firm* — Marshall, Gerstein & Borun LLP

(57) ABSTRACT

A method for identifying products associated with items of content, including: receiving, by a server from a first client device, a first request for a first item of content; retrieving, by the server from data storage, the first item of content in response to the first request for the first item of content; retrieving, by the server from data storage, an identification of an Internet search request transmitted by a second client device within a predetermined temporal window of playback of the first item of content by the second client device; retrieving, by the server from data storage, a second item of content selected in response to the Internet search request transmitted by the second client device; and providing, by the server to the first client device, the first and second items of content.

17 Claims, 6 Drawing Sheets

Related U.S. Application Data

(60) Provisional application No. 62/332,770, filed on May 6, 2016.

(51) Int. Cl.
  *G06Q 30/02* (2012.01)
  *H04L 12/26* (2006.01)

(56) References Cited

U.S. PATENT DOCUMENTS

| | | |
|---|---|---|
| 9,578,358 B1 | 2/2017 | Skolicki et al. |
| 2009/0300547 A1 | 12/2009 | Bates et al. |
| 2011/0276397 A1 | 11/2011 | Moxley et al. |
| 2015/0095329 A1 | 4/2015 | Sanio et al. |
| 2015/0213515 A1 | 7/2015 | Fernandez-Ruiz |
| 2015/0235264 A1 | 8/2015 | Curtis et al. |
| 2015/0289120 A1 | 10/2015 | Harder et al. |
| 2017/0318336 A1 | 11/2017 | Hackett et al. |

OTHER PUBLICATIONS

Final Office Action for U.S. Appl. No. 15/171,779 dated Aug. 2, 2018 (30 pages).
Non-Final Office Action for U.S. Appl. No. 15/171,779 dated Jan. 31, 2019 (16 pages).
Non-Final Office Action for U.S. Appl. No. 15/171,779 dated Mar. 28, 2018 (21 pages).
Notice of Allowance for U.S. Appl. No. 15/171,779 dated May 21, 2019 (7 pages).
International Search Report and Written Opinion in PCT/US2016/069612, dated Apr. 11, 2017, 14 pages.
International Preliminary Report on Patentability in PCT/US2016/069612, dated Aug. 9, 2018, 20 pages.
First Office Action for CN Appln. Ser. No. 201680079002.1 dated Apr. 30, 2021 (9 pages).

US 11,188,603 B2

ANNOTATION OF VIDEOS USING AGGREGATED USER SESSION DATA

RELATED APPLICATIONS

This application is a continuation of, and claims priority under 35 U.S.C. § 120, to U.S. patent application Ser. No. 15/171779, filed Jun. 2, 2016, which claims priority to and benefit of U.S. Provisional Patent Application No. 62/332770, entitled "Annotation of Videos Using Aggregated User Session Data," filed May 6, 2016, the disclosures of each of which are hereby incorporated by reference in their entirety.

BACKGROUND

Items of content on the Internet, such as videos, pictures, audio recordings, text, interactive games, quizzes, or other such content, may be used by content providers to advertise products and services for consumers to purchase. Such content may be displayed as the user views a video, sometimes referred to as a broadcast, stream, program, film, feed, or by other such names.

SUMMARY

Content, including videos or other such content, may include various items or products, and may be relevant to or associated with various genres, keywords, or subjects. Traditional attempts at identification have included time-consuming and expensive manual tagging of content, or processor-intensive visual analysis or "screen scraping". However, by leveraging user search or web browsing activity during and subsequent to viewing content, the systems and methods discussed herein provide automatic identification of content through aggregation and correlations between requests of large numbers of users.

Once identified, internet content may be monetized through additional paid content, such as advertising or sponsored content related to objects or products identified in the content. In some instances, in which items of content are individually or serially displayed, related advertising may be displayed in banners, adjacent to the content, or in pop-up windows. For multimedia content, such as videos, advertising may be shown before (pre-roll) or after (post-roll) playing the video the user has selected, as a picture-in-picture (PIP) advertisement where the advertisement plays in a corner of the video selected by the user, or as interstitial advertising inserted into a break in the middle of the selected video or in-between items of content. The advertisement may allow the viewer of the video to click on or interact with the advertisement in order to purchase the advertised product or service while watching the video or immediately after its end. This has the advantage of allowing the user to purchase the product or service without leaving the video (or the website playing the video) or to perform an additional search for the product or service.

One implementation disclosed herein is a method for identifying products associated with items of content. The method includes receiving, by a server from a first client device, a first request for a first item of content, retrieving, by the server from data storage, the first item of content in response to the first request for the first item of content, and retrieving, by the server from data storage, an identification of an Internet search request transmitted by a second client device within a predetermined temporal window of playback of the first item of content by the second client device. The method also includes retrieving, by the server from data storage, a second item of content selected in response to the Internet search request transmitted by the second client device, and providing, by the server to the first client device, the first and second items of content.

In some implementations, the method includes calculating, by the server, a difference between a time that the first item of content was played by the second client device and a time that the Internet search was performed, and comparing, by the server, the difference to a predetermined threshold value to determine whether the Internet search request transmitted by the second client device occurred within the predetermined temporal window of playback.

In some implementations, the method includes aggregating, by the server, a plurality of identifications of Internet search requests transmitted by a plurality of client devices within a plurality of predetermined temporal windows of playback of a plurality of respective items of content by the plurality of client devices. In other implementations, the method includes determining, by the server, that the Internet search request comprises a search for a product. In still other implementations, the method includes retrieving an advertisement for a product. In yet still other implementations, the method includes aggregating, by the server, a plurality of identifications of Internet search requests transmitted by a plurality of client devices within a plurality of predetermined temporal windows of playback of the first item of content by the plurality of client devices. In some implementations, the method includes the Identification of an Internet search request transmitted by the second client device while the first item of content was played.

In another aspect, the present disclosure is directed to a system for identifying products associated with items of content. The system includes a server in communication with data storage and with a plurality of client devices. The server executes operations to receive, from a first client device, a first request for a first item of content, retrieve, from data storage, the first item of content in response to the first request for the first item of content, and retrieve, from data storage, an identification of an Internet search request transmitted by a second client device within a predetermined temporal window of playback of the first item of content by the second client device. In some implementations, the system retrieves, from data storage, a second item of content selected in response to the Internet search request transmitted by the second client device, and provides, to the first client device, the first and second items of content.

In some implementations, the system includes a server that executes operations to calculate a difference between a time that the first item of content was played by the second client device and a time that the Internet search was performed, and compare the difference to a predetermined threshold value to determine whether the Internet search request transmitted by the second client device occurred within the predetermined temporal window of playback. In other implementations, the system includes a server that executes operations to aggregate a plurality of identifications of Internet search requests transmitted by a plurality of client devices within a plurality of predetermined temporal windows of playback of a plurality of respective items of content by the plurality of client devices. In still other implementations, the system includes a server that executes operations to determine that the Internet search request comprises a search for a product.

In some implementations, the system is further configured for retrieving the second item of content including retrieving an advertisement for a product. In other implementations, the system includes a server that executes operations to aggregate a plurality of identifications of Internet search requests transmitted by a plurality of client devices within a plurality of predetermined temporal windows of playback of the first item of content by the plurality of client devices. In still other implementations, the system includes the identification of an Internet search request transmitted by the second client device within the predetermined temporal window of playback of the first item of content comprises the Identification of an Internet search request transmitted by the second client device while the first item of content was played.

In another aspect, the present disclosure is directed to a method for dynamic selection and display of related content. In some implementations, the method includes providing, by a server to each of a plurality of client devices, a first item of content for display, receiving, by the server from each of the plurality of client devices, an Internet search request, and extracting a subset of the received Internet search requests, by the server, responsive to a timestamp of each of the Internet search requests of the subset being within a predetermined temporal window of a time of providing the first item of content to the corresponding client device. In other implementations, the method includes aggregating the subset of Internet search requests, by the server, to generate a second subset of contextually related Internet search requests having an aggregated frequency greater than a predetermined threshold, receiving, by the server from an additional client device, a request for the first item of content, and providing, by the server to the additional client device, the first item of content and a second item of content selected based on the second subset of contextually related Internet search requests.

In some implementations, the method includes the extracting a subset of the received Internet search requests further including calculating, by the server, a difference between a time that the first item of content was played by the corresponding client device and a time that the Internet search was performed, and comparing, by the server, the difference to a predetermined threshold value to determine whether the Internet search request transmitted by the corresponding client device occurred within the predetermined temporal window of playback. In other implementations, the method further includes determining, by the server, that the Internet search request includes a search for a product. In still other implementations, the method further includes retrieving, from data storage, a second item of content selected in response to the Internet search request transmitted by additional client device. In yet still other implementations, the method includes retrieving the second item of content comprises retrieving an advertisement for a product. In an alternate implementation, the method includes the predetermined temporal window of a time of providing the first item of content comprises a time period that the first item of content was playing on the corresponding client device.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

Like reference numbers and designations in the various drawings indicate like elements.

DETAILED DESCRIPTION

Figure 1A:
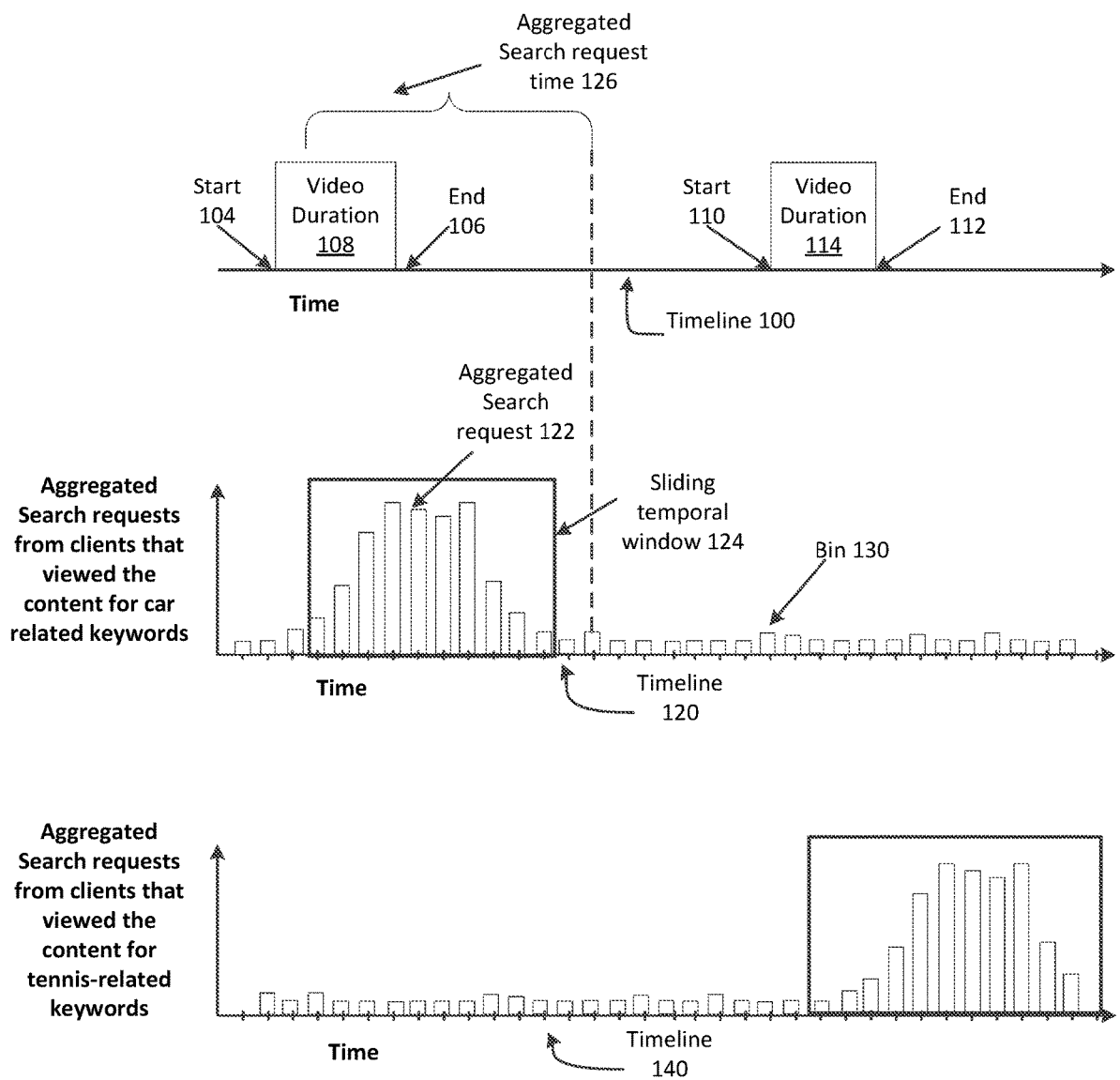
FIG. 1A is a diagram of aggregated search requests for various content items on a timeline, associated with the playback of a video, according to one implementation, using a sliding temporal window.

By displaying advertisements during the playback of a video, content providers or advertisers can draw attention to their products and services. The more relevant the advertisement to the subject matter of the video, then the more likely that the viewer will become a consumer of the advertised product or service. However, the identification and selection of such relevant content to show during playing of a video (or immediately after the playback has ended) is a manual and time-consuming process. For instance, a content provider may need to sort through countless videos to identify the content that should be displayed each time a viewer watches the video. In addition, many videos may fail to include a title that accurately describes the content of the video, or the video may include many differing topics that could not be described with a common title. Even more, the video may not be titled at all or have associated metadata or textual data (e.g., keywords, descriptions, comments, creator annotations, tags, etc.) to indicate the video's subject matter. In each instance, the content provider may need to watch the entire video in order determine the video's relevance to the advertisement of products and services. Advertisers who become discouraged with the manual process of linking or associating advertisements with videos may decide to limit or give up on using the service altogether.

Search behaviors of a large number of users who watched an item of content may be grouped together to identify commonly searched keywords or phrases that are likely related to the item of content. For example, after watching a video including an actor in a stylish trenchcoat, a large number of users may search online for information related to trenchcoats, coat manufacturers or retailers, etc. By aggregating these searches together and noting the temporal relationship between the searches and when the users watched the video, the system may automatically identify that the video includes a trenchcoat. Aggregation may be time dependent so as to exclude searches from much earlier or later in time than when the user watched the item of content. The most commonly searched phrase or keyword may be identified as likely associated with the item of content, with confidence scores or similar weighting applied based on frequency of search or change in search rates among users recently watching the video compared to a baseline.

Accordingly, in one implementation of the systems and methods discussed herein, identifying products associated with items of content without requiring explicit metadata or textual data may include the data analysis of aggregated behavior of many users who have watched the video. In some implementations, Internet searches that were performed by users in a temporal window during playback or shortly afterwards may be aggregated. The aggregated data from this window may be used to identify products that are likely related to the video, with confidence of association increased based on the size of the aggregated search numbers. In some implementations, the aggregated data may be used to identify textual data that is relevant to the video or specific time slots of the video, where this textual data may be used to identify products and services that are relevant to the keywords. In other implementations, items of content (e.g., ads) for the identified products or services may be included with future playback of the video.

FIG. 1A is a diagram of aggregated search requests for various content items on a timeline, associated with the playback of a video, according to one implementation, using a sliding temporal window. Each of timelines 100, 120, 140 represent the same period in time, but are shown separately for clarity. Accordingly, this time period may be referred to generally as timeline 100. As shown, a timeline 100 may include the playback of a video on a client device 206 from start 104 to end 106, where video duration 108 refers to the positive difference in time from end 106 to start 104. Although shown with a fixed duration of time, in many implementations, video duration 108 may have different playback times, such as 1 second, 30 second, 1 minute, 1 hour, or any other duration of playback time of a video (i.e., video duration 108 may be of any width).

In addition, timeline 100 may include multiple instances of start 104, end 106, and video duration 108 on timeline 100 illustrating the continuous start and stop of the playback of the same video on one or more client devices 206. To illustrate this, timeline 100 includes start 110 and end 112 whose difference in time is referred to as video duration 114, which represents either the same video played back during video duration 108 or an entirely different video (e.g., a tennis match) than video duration 108. For example, a user of client device 206 may watch a video of a television episode about cars for the time period represented by video duration 108. After watching the television episode, the user may wait for a portion of time, shown as the difference between end 106 to start 104. After which, the user may start the playback of a video on client device 206, or any other device associated with client device 206, of a tennis match where the continuous or intermittent playback (e.g., paused and resumed one or more times) lasts for a duration illustrated by video duration 114.

In some implementations, start 104 is the same video played during video duration 108, but the played portion is after video duration 108. For example, the user can pause the playback of a video of a sporting event at end 106 and then resume the paused sporting event sometime later at start 104. In other implementations, the portion played during video duration 114 is a time before start 104, which may be the case where the user rewinds the video played during video duration 108 to a time before start 104. In some implementations, video duration 114 may overlap some or all of the video played during video duration 108. For example, the user may have watched the video played during video duration 108 more than once where video duration 114 represents an additional playback of the video viewed during video duration 108.

The video played during video duration 108 may include one or more clips, movies, films, television episodes or series, commercials, advertisements, user-created content, documentaries, musicals, or multimedia streams. Accordingly, video duration 108 may be associated with any one or any combination of video content or programming. For example, video duration 108 may represent the time associated with the playback of a movie about the universe, which may last for 2 hours 35 minutes 0 seconds, or shown another way, as a video time index of 00:00:00 to 02:35:00. Immediately afterwards, however, the same video may include the playback of a television episode on the animal kingdom that lasts for 1 hour 24 minutes 59 seconds, or shown as a video time index of 02:35:01 to 04:00:00.

Although the example provided herein describes a single video with two different programs (i.e., movie about the universe followed by an episode on the animal kingdom), a single video may contain numerous programs, such as the concatenation of 2 programs, 5 programs, 10 programs, 20 programs, 50 programs, or any other number of programs in the same video. Additionally, each program may be of the same subject matter. For example, a video may contain more than one or all of the episodes of a television programs. In other implementations, each program may be unrelated in subject matter, genre, time period, duration, language, or any other feature that may distinguish one program or video from another. For example, as described above, video duration 108 may contain a movie about the universe up until time index 02:35:00 followed by a television episode on the animal kingdom. In this example, neither the movie nor the television episode are related in subject matter. In other implementations, the programs contained within a single video are related in subject matter. In still other implementations, a video may be divided into multiple scenes, which may be further divided into camera shots. In various implementations, a video duration 108 may refer to any of these different portions and subportions.

In some implementations, the difference in time between end 106 and start 104 is random. In other implementations, the difference in time between end 106 and start 104 is fixed. For example, after the playback of a video is stopped (e.g., end 106), the playback of the same video is then resumed after 30 seconds, after 1 minute, after 30 minutes, after 1 hour, or any other moment in time. In another implementation, the difference in time between end 106 and the start 104 is synchronous to a trigger event. Triggering events may include, without limitation, a calendar associated with a client device, a program guide prepared or managed by a video content provider, a recording schedule associated with a client device, a recording schedule linked to another device such as a DVR, or triggering rules configured on the client device or second client device associated with the client device.

As discussed above, timelines 120 and 140 refer to the same period of time as timeline 100. Each of these timelines 120, 140 are shown with an example graph of aggregated requests for a topic from a large number users received over a plurality of bins or time windows. For example, timeline 120 illustrates an example of search requests relating to cars received over time. Timeline 140 illustrates an example of search requests relating to tennis received over time. As shown, the search requests of timeline 120 include a surge or spike shortly after video duration 108—this indicates that the video or portion of the video played during video duration 108 is likely associated or related to cars. Correspondingly, timeline 140 does not show a surge or spike in search requests shortly after video duration 108, indicating that the played portion of the video is likely not associated with tennis.

Conversely, the surge or spike in search requests for tennis-related keywords shortly after video duration 114, as shown on timeline 140, indicates that the video or portion of the video played during video duration 114 is likely associated or related to tennis. Likewise, the absence of any noticeable spike or surge in search request for car-related keywords shortly after video duration 114, as shown on timeline 120, indicates that the video or portion of the video played during this time is likely not associated or related to cars.

Still referring to timeline 120 and in more detail, during this time period, as shown, a search provider may receive search requests for one or more content items during the playback of video. These search requests may arrive at a baseline rate during most of the time, but may surge or spike shortly after related content is shown, as users search for things they saw in the video. Accordingly, as shown, each bar represents the number of search requests received within a short time window (e.g. 10 seconds, 30 seconds, 1 minute, or any other such timeframe). The baseline rate may be very low, such as 1 to 2 search requests per window. However, it may surge at some point shortly after the video, as shown. For example, a first user may watch the video and 30 seconds later, search for something relating to cars. A second user may similarly watch the video and perform a similar search after 1 minute. The system will record, log, or cache in memory the search results from a plurality of users who watch the same video and perform searches for keywords or phrases. These search requests may then be aggregated or grouped into temporal windows as shown on timelines 120 and 140, each represented by aggregated search request 122, which is shown as a bar with the height of the bar representing the aggregated number of searches received within that time window (e.g. n search requests for the same topic within t time).

Bin 130 is a bar that represents the aggregated number of searches (or aggregation score) at a particular time and for a particular keyword. Bin 130, as shown on timelines 120 and 140, may be specified by content management server 230 as consecutive, non-overlapping fixed interval of time, such as in seconds, minutes, hours, days, or any other time division. In other implementations, bin 130 may change based on changing events, such as, but not limited to, the frequency of requests for video content, number of client devices requesting video content, the size of the video content requested, or other factors. Furthermore, each bin 130 may be adjacent and of equal size (e.g. each bin representing equal and consecutive periods of time). For instance, because the bins are of equal size, they appear as a rectangle erected over the bin with a height that is proportional to the number of search requests for a particular keyword or phrase made from the client device or a plurality of client devices. For clarity, each bin may be referred to as bin 0, bin 1, bin 2, and so on; starting from time 0 and continuing onward. For example, the first bin on timeline 120 may be referred to as bin 0, while the first bin in sliding temporal window 124 may be referred to as bin 3. Furthermore, each bin may straddle a tick mark on a timeline's x-axis. For example, when each bin is 1 minute, all search requests greater than and equal to −30 seconds to less than 30 seconds from the start of the video playback will fall into bin 1. Likewise, all search requests greater than and equal to 30 seconds to less than 60 seconds from the start of the video playback will fall into bin 2.

A user may search for content at any time after starting the playback of a video, referred to as a search request time. In particular, a search request time represents the time difference between a search request executed on a client device and the starting time of a video playback, such as start 104 or start 1 start 110 on timeline 120. As discussed, these individual search requests are aggregated and analyzed to determine if the searched keyword or phrase is associated with or relevant to all or a portion of the video. These aggregated data points are represented on timelines 120 and 140 in the bin that corresponds with their search request time. The time difference between the search request time for a given bin and the beginning of a video playback is referred to as an aggregated search request time 126.

A content manager server may use any algorithm to aggregate search requests that fall within the same bin. As an example, 8 client devices may perform a search for "cars" at the following search request times with respect to the start of a particular video playback: 1 minutes 0 seconds, 1 minutes 10 seconds, 1 minutes 15 seconds, 1 minutes 35 seconds, 1 minutes 50 seconds, 1 minute 58 seconds, 2 minutes 5 seconds, and 2 minutes 45 seconds. By setting each bin to 1 minute, the search requests may be aggregated as follows: bin 0 contains an aggregated search request of 0, bin 1 contains an aggregated search request of 3, bin 2 contains an aggregated search request of 4, and bin 3 contains an aggregated search request of 1.

Although aggregated search request time 126 is shown with respect to a single bin 130 of aggregated search request 122, an aggregated search request time 126 is associated with each bin of aggregated search request 122 on a timeline. As such, aggregated search request time 126 may be negative, indicating that an internet search is performed before the playback of a video. Conversely, aggregated search request time 126 may be positive, indicating that an internet search is performed during or after the playback of a video. Although less likely to occur than the prior scenarios, in some implementations, aggregated search request time 126 may be zero, indicating that an internet search request is performed perfectly coincident with the start of the video playback. In this instance, the playback of the video may start on a first client device, and the internet search may be simultaneously executed on a second client device.

Additionally, each bin on each timeline associated with a keyword or phrase, such as timelines 120 and 140, has a corresponding aggregated search request time 126 related to each video duration on the timeline. For example, referring to timeline 120, each bin 130 has two aggregated search request times: one with respect to start 104 (for video duration 108) and one with respect to start 106 (with respect to video duration 114).

Each search request is aggregated with other search requests for the same keyword (e.g., car) or phrase (e.g., red car) within a temporal window of time from the playback of a video. This aggregation may include the search request from the same client device or search requests across a plurality of client devices. For instance, a search request on a mobile phone for the keyword "car" at a search request time of 2 minutes with respect to video duration 108 may be aggregated with a second search request on a second mobile device for the same keyword and at the same search request time with respect to the same video duration. As such, these aggregated data points will fall within the same bin 130 on a timeline associated with the keyword "car." As another example, a search request on a mobile device for the keyword "engine" at a search request time of 3 minutes with respect to video duration 114 may be aggregated with a second search request on a personal computer for the same keyword. The aggregation of these two data points will fall within the same bin 130 on a timeline associated with the keyword "engine." In some implementations, the plurality of client devices are associated with a single device identifier 314 or associated with a plurality of device identifiers 314.

In other implementations, aggregated search requests 122 represents the aggregated score for a category of searched keywords instead of a single keyword. For example, separate internet searches for keywords such "transmission", "engine", and "muffler" occurring at the same search request time or for the same bin may be aggregated together and shown on a single timeline, such as timeline 120. In this instance, aggregated search request 122 represents the aggregation of searches for car-related keywords at a given time with respect to the playback of a particular video.

The search requests made by users of client devices, in some implementations, may be anonymized so that the privacy of the user is protected. In this instance, a content manager server may aggregate the search request identification (e.g., search request ID 224), instead of the search results themselves. For example, a mobile device may send a search request to content management server 230 for content related to the phrase "red car." As described in more detail later, a search request may include numerous identifiers such as device identifiers, session identifiers, and any other data collected by a collection agent associated with the mobile device. Accordingly, in this implementation, the aggregated search request IDs, such as the aggregation of search request IDs 224, may be plotted on timeline 120.

After an aggregated search request 122 is calculated for each bin, content management server 230 may then calculate a single aggregation score for one or more bins that fall within a sliding temporal window. As previously mentioned, aggregated search requests made during or immediately following the playback of a video may be related to that video, especially aggregated search requests that are close in time to the viewing of the video. Accordingly, content management server 230 can select the bins that are most suited for use, such as those immediately following the start of a video playback, by using a sliding temporal window. From these selected bins, a single aggregation score may be calculated without aggregated search requests 122 outside of the sliding temporal window from interfering with the calculation. This is especially useful in improving the accuracy and processing speed for content management server 230 by reducing the data processing load.

Referring to timeline 120 and in more detail, content management server 230 may place a sliding temporal window 124 around any number of bins, such as 1, 2, 5, 10, or any other integer value. For example, with a sliding temporal window of 10 bins, content management server 230 may retrieve the 10 aggregated search requests 122 associated with bin 3 to bin 12, counting from left to right on timeline 120. Subsequently, content management server 230 may then aggregate or sum each aggregated search requests 122 into a single aggregation score for the given position of a sliding temporal window 124. In some implementations, content management server 230 may then increment or slide the window farther in time so it includes one or more new bins not included in the sliding temporal window's previous position. For example, by incrementing sliding temporal window 124 to the right by 1 bin position and holding the window size fixed, sliding temporal window 124 may now include bin 4 to bin 13. In this new position, content management server 230 may calculate a new aggregation score for the window. Content management server 230 may repeat this process of sliding (in any increment value) and calculating for any number of sliding temporal window positions and storing each aggregation score in a database.

While the particular size of the sliding temporal window is provided here as an example embodiment, there is no particular requirement for any such limitation. For example, other sliding temporal window sizes may be used. In some implementations, sliding temporal window 124 may include only a portion of a bin. For example, the size of sliding temporal window 124 may be set to 9.5 bins. In this instance, the calculation of an aggregation score for a sliding temporal window of this size will only include aggregated search requests 122 for 9 bins added to half of the aggregated search request 122 for the bin partially included in the sliding temporal window. Moreover, the size of the sliding window can be adjusted by content management server 230 in response to the frequency of requests for video content, number of client devices requesting video content, the size of the video content requested, or other factors. In addition, sliding temporal window may be shaped as a triangle, a rectangle, a square, a bell curve, a notch filter, or any other shape.

As shown in timeline 120, the aggregation score calculated for each sliding temporal window position applies an equal weight to each aggregated search request 122 associated with each bin. However, timing differences or latency occurs when a client device sends an internet search request and content management server 230 receives the request. This latency can impact the accuracy of the determination that specific keywords or phrases are related to all or a portion of a video. To lessen the impact of this latency on the calculation, content management server 230 may implement a sliding temporal window that applies a different weighting factor to each bin within the window. In other words, the weighting factor assigned for each bin may indicate the ratio of that bin's aggregated search request 122 included in the aggregation score calculation for the sliding temporal window. Each weighting factor may be set to any value from 0% to 100% and may be fixed or change over time.

Figure 1B:
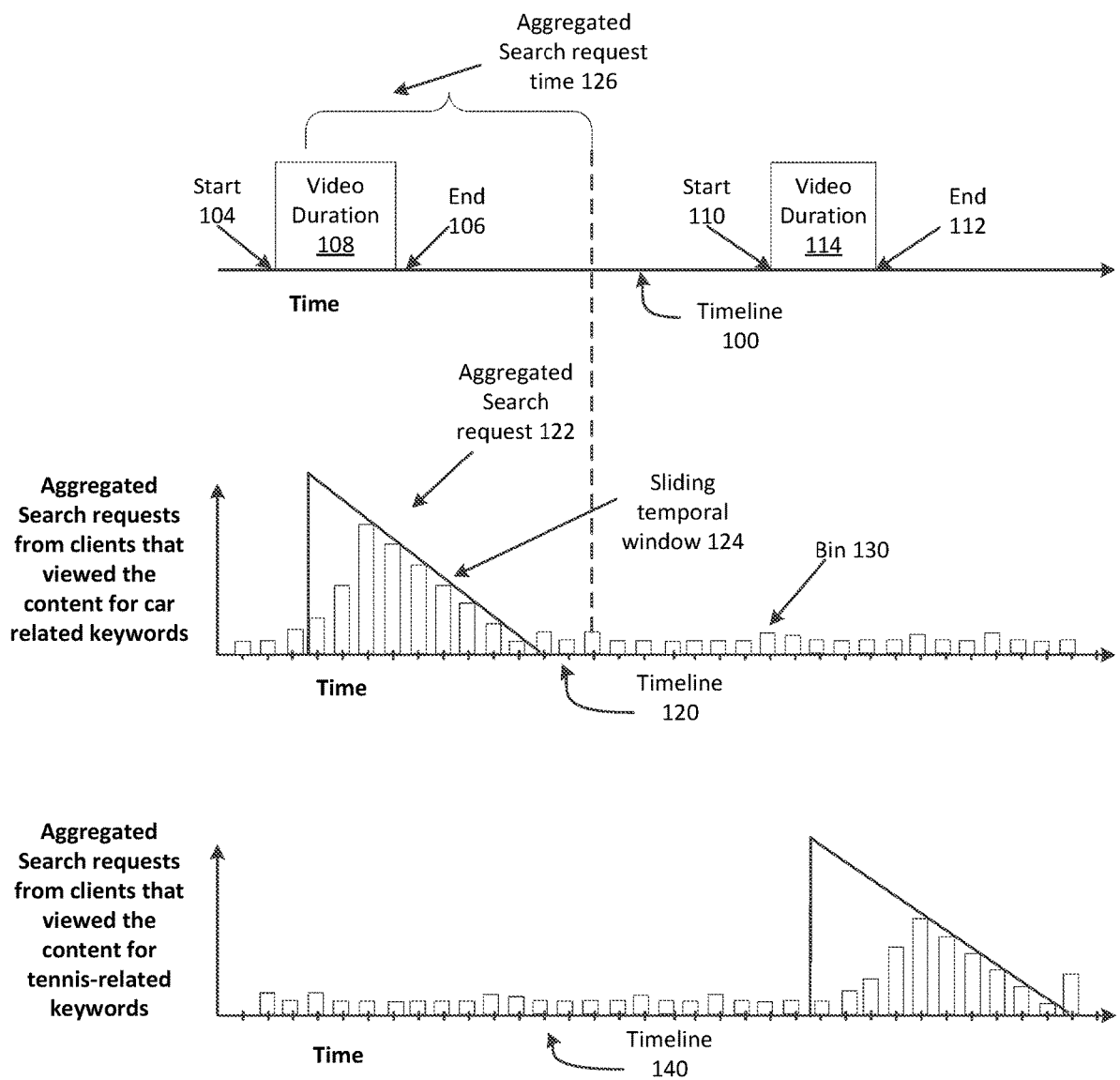
FIG. 1B is a diagram of aggregated search requests for various content items on a timeline, associated with the playback of a video, according to one implementation, using a weighted sliding temporal window.

FIG. 1B is a diagram of aggregated search requests for various content items on a timeline, associated with the playback of a video, according to one implementation, using a weighted sliding temporal window. As shown, each bin within the sliding temporal window may be assigned a weighting factor that decreases for each bin farther in time from the playback of a video. In this instance, the sliding temporal window may give greater weight to the bins closest in time to the start of the video and less weight for the bins farthest in time from the start of the video. For example, sliding temporal window 124, as shown on timeline 120, includes 9 bins referred to hereinafter from left to right as bin 3 to bin 11. Each bin may have an aggregated search request equal to 5, 10, 20, 17, 13, 9, 8, 3, and 1; respectively. Content management server 230 may assign a weighting factor to each bin, from bin 3 to bin 11, equal to 100%, 90%, 80%, 70%, 60%, 50%, 40%, 30%, and 20%; respectively. Accordingly, the aggregation score calculation for the sliding temporal window at a position that includes bin 3 to bin 11 for search requests for car-related keywords, as shown in FIG. 1B, may be as follows: 5 (100%)+10 (90%)+20 (80%)+ 17 (70%)+13 (60%)+9 (50%)+8 (40%)+3 (30%)+1 (20%) =58.5. Although the weighted sliding temporal window shown in FIG. 1B gives more weight to the bins closest to the playback of the video, any weighting assignment scheme may be applied to the bins. For example, rather than a triangular or sawtooth function as shown, in some implementations, a bell curve function may be applied to weight the bins. For example, the first bin may be given a weight of 20%, the next bin 40%, the following bin 80%, the next bin 90%, and the next 100%, and back down again. This may provide heavier weight to bins in the center of the sliding window, potentially increasing accuracy of categorization, and accounting for hysteresis and delay from users between seeing something interesting and initiating a search request.

Content management server 230 may use an aggregation score calculated for each sliding window or weighted sliding window position to identify specific keywords or phrases that are relevant to all or a portion of a video. Relevancy may be based on one or more features of the video, such as title, captions, subject matter, genre, time period, duration, language, video resolution, or any other feature that may distinguish one program or video from another. For content management server 230 to identify relevant features, it may require an aggregation score to equal or exceed a threshold value. This threshold may be set to any integer or non-integer value.

Figure 1C:
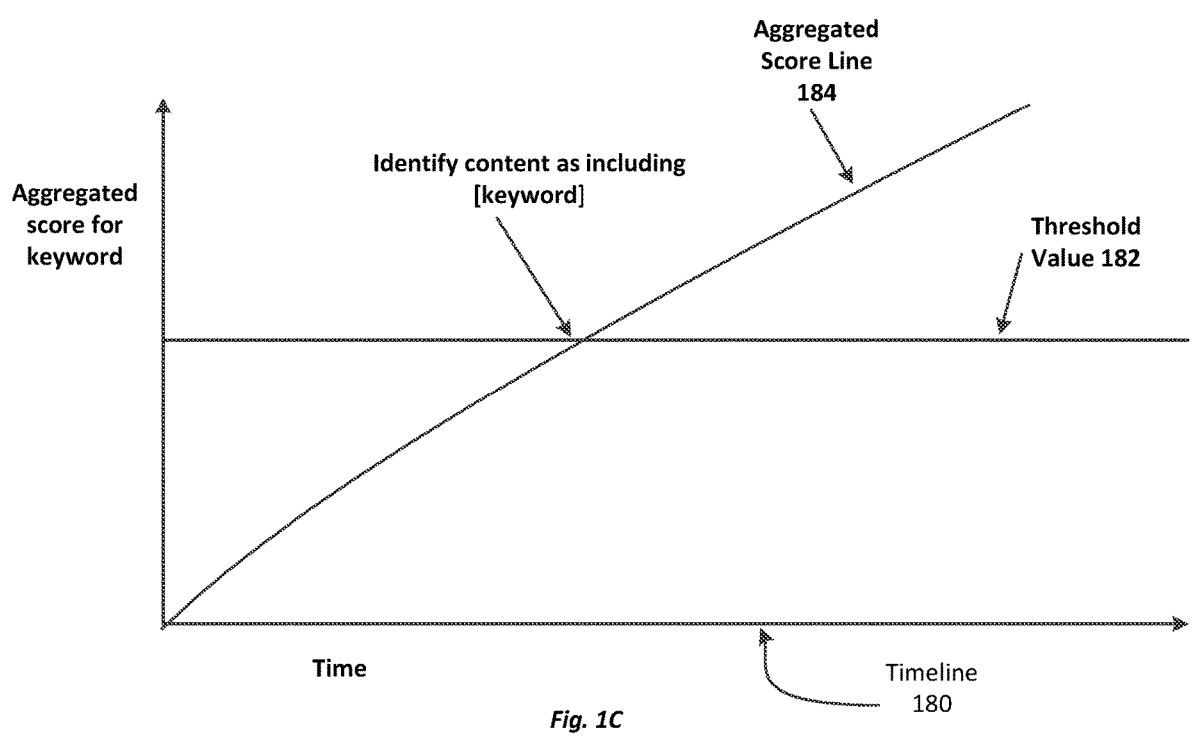
FIG. 1C is a diagram of aggregated search scores for a keyword on a timeline, compared to a threshold value identifying the keyword as relevant to all or a portion of a video, according to one implementation.

FIG. 1C is a diagram of aggregated search scores for a keyword on a timeline, compared to a threshold value identifying the keyword as relevant to all or a portion of a video, according to one implementation. Threshold value 182 may be specified by content management server 230 as a fixed value, shown on timeline 180 as a horizontal line. At the point in which an aggregated score for a particular keyword, shown on timeline 180 as aggregated score line 184, equals to or exceeds threshold value 182, content management server 230 may identify all or a portion of a video as relevant to the keyword associated with the aggregated score. For instance, in the previous example, an aggregation score of 58.5 was calculated for a weighted sliding temporal window that included 9 bins of search requests for car-related keywords. If the threshold value is set to 65, then content management server 230 would not identify a portion or all of the video associated with video duration 108 as relevant to car-related keywords. Conversely, if threshold is set to 55, then content management server 230 would identify a portion or all of the video associated with video duration 108 as relevant to car-related keywords. The same analysis would apply for implementations using a non-weighted sliding temporal window.

Figure 2:
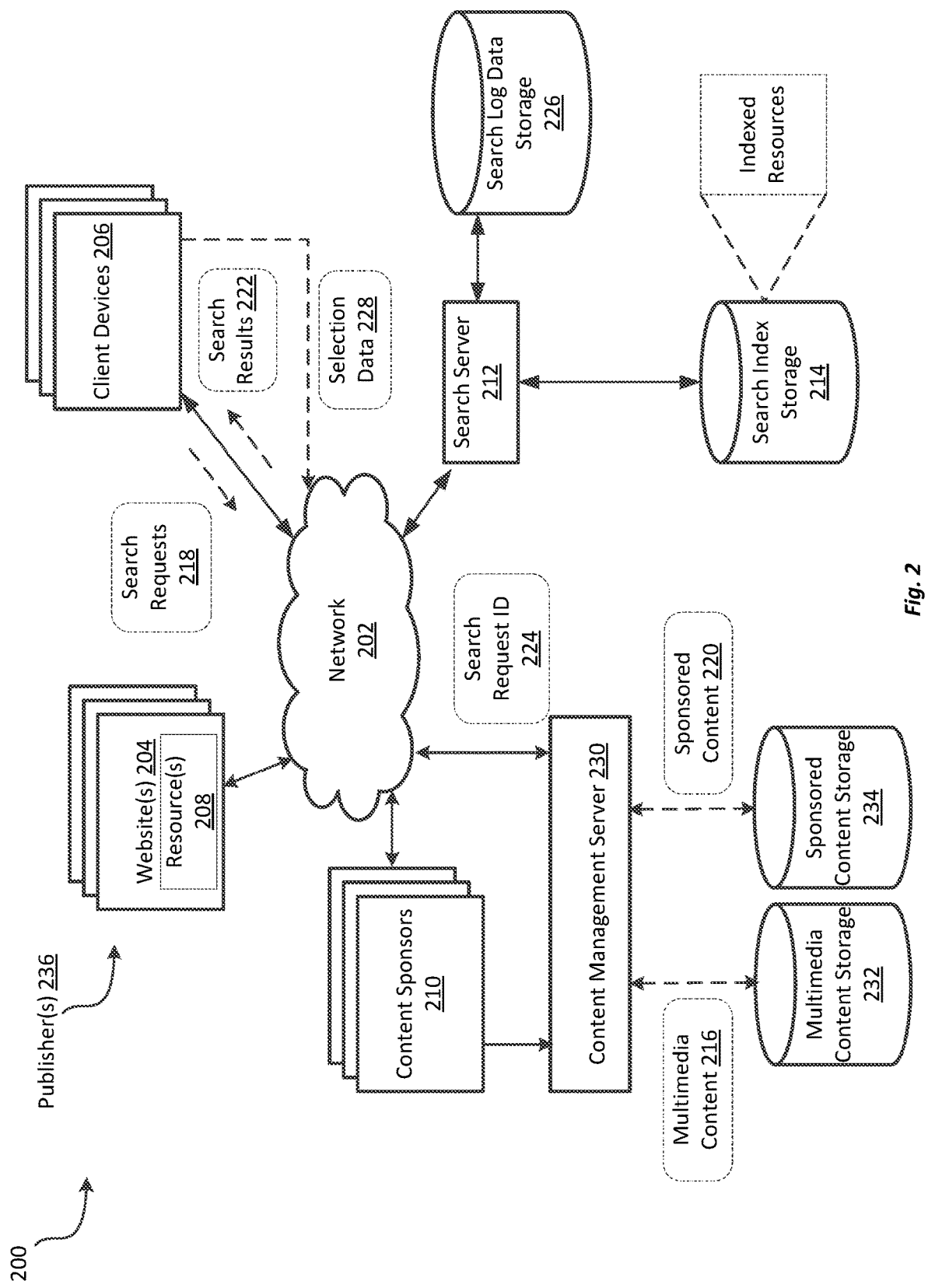
FIG. 2 is a block diagram of an example environment for identifying, selecting, and delivering content relevant to the playback of a video.

FIG. 2 is a block diagram of an example environment 200 for identifying, selecting, and delivering content relevant to the playback of a video. The environment 200 includes a search server 212 that provides search services and a content management server 230 that provides multimedia content 216 (e.g., videos) including providing sponsored content 22 (e.g., videos, images, text, ads) that are relevant to multimedia content 216. The example environment 200 includes a multimedia content storage 232, which stores multimedia content 216 received or gathered from network 202 by content management server 230. The example environment 200 may also include sponsored content storage, which stores the sponsored content 220 uploaded to the content management server 230 by content sponsors. The example environment 200 may include network 202, e.g., a local area network (LAN), wide area network (WAN), the Internet, or a combination of them, that connects publisher, client device 206, search server 212, content sponsors, and content management server 230. The environment 200 may include many thousands of publisher, content sponsors, and client device 206.

As described in the below passages and specifically in the description of FIG. 3, a content management server (e.g., content management server 230), performs a series of operations to discover sponsored content (e.g., sponsored content 220) that may be relevant to multimedia content (e.g., multimedia content 216). These operations may be categorized into two groups: training of the server and content delivery by the server. During the training phase, the content management server may perform numerous operations including, e.g., i) receiving from a client device a request for multimedia content (e.g., video); ii) retrieving and delivering the multimedia content to the client device; iii) receiving or retrieving a search request ID (e.g., search request ID 224) associated with a search request (e.g., search request 218) transmitted by a client device within a temporal window of playback of the multimedia content by the client device, including session identifiers (e.g., session identifiers 316), device identifiers (e.g., device identifiers 314), search requests (e.g., search requests 218), search results (e.g., search results 222), and any other data collected by a collection agent such as collection agent 312; iv) calculating a time difference between a time record associated with the search request ID to a playback time of the delivered multimedia content on the client device; v) comparing the time difference to a temporal window size threshold (e.g., sliding temporal window 124); vi) if the time difference is within the temporal window size threshold, aggregating the search request ID with search request IDs received/retrieved from other client devices, at the same bin location; vii) calculating an aggregated score for each unique keyword; viii) if the aggregated score is satisfied (e.g., greater than a threshold value, greater than and equal to a threshold value), identify and/or label the multimedia content 216 as relevant to the search request ID. In some implementations, content management server 230 may instead aggregate each search request rather than the search request ID.

During the content delivery phase, the content management server 230 may perform numerous operations including, e.g., i) receiving a request from a client device for multimedia content multimedia content 216; ii) retrieving the multimedia content 216; iii) retrieving sponsored content 220 identified by the content management server 230 as relevant to the multimedia content 216; and iv) delivery the multimedia content 216 and the relevant sponsored content 220 to a client device. In some implementations, content management server 230 may insert the sponsored content 220 in the multimedia content 216, such that the sponsored content 220 is displayed during or immediately after playback of the multimedia content 216. In other implementations, content management server 230 may deliver the sponsored content 220 and the multimedia content 216 to a client device as separate, but associated, items of content.

A website 204 can include one or more resources 208 associated with a domain name and hosted by one or more servers. An example website is a collection of webpages formatted in hypertext markup language (HTML) that can contain text, images, multimedia content, and programming elements (e.g., scripts). Each website 204 can be maintained by a publisherpublisher, e.g., an entity that manages and/or owns the web property.

A resources 208 is any data that can be provided by the website 204 over the network 202 and that is associated with a resource address. Resources 208 include HTML pages, word processing documents, portable document format (PDF) documents, images, multimedia content (e.g., video), and feed sources, to name a few examples. The resources 208 can include content, e.g., words, phrases, images and sounds, and may include embedded information (e.g., meta information and hyperlinks) and/or embedded instructions (e.g., JavaScript scripts).

A client device 206 is an electronic device that is under control of a user and is capable of requesting and receiving resources over the network 202. Example client device 206 include personal computers, mobile communication devices (e.g., smartphones), and other devices that can send and receive data over the network 202. A client device 206 typically includes a user application, e.g., a web browser, to facilitate the sending and receiving of data over the network 202.

To facilitate searching of resources 208, the search server 212 can identify the resources 208 by crawling and indexing the resources 208 provided by the publishers. Data about the resources 208 can be indexed based on the resource 208 to which the data corresponds. The indexed and, optionally, cached copies of the resources 208 are stored in a search index storage 214.

Client device 206 submits search requests 218 to the search server 212. In response, the search server 212 accesses the search index storage 214 to identify resources 208 that are predicted to be relevant to the search requests 218, for example based on relevance scores that have been computed for the resource 208. The search server 212 selects resources 208, generates search results 222 that identify the resources 208, and returns the search results 222 to the client device 206. A search result 222 is data generated by the search server 212 that references a resource 208 that is responsive to a particular search query, and includes an active link (e.g., a URL) to the resource. An example search result 222 can include keywords or metatags, multimedia content, a multimedia title (e.g., video), a web page title, a snippet of text or a portion of an image extracted from the web page, and the URL of the web page.

In some implementations, search server 212 is configured to be in a master-slave relationship with content management server 230, such that content management server 230 manages and controls all functionality of search server 212 as described herein. For example, in response to receiving search requests 218, search server 212 will select and generate search results 222 without delivering search results 222 to client device 206. Instead, search server 212 will deliver search results 222 to content management server 230 upon request by content management server 230, or in some instances, without request from content management server 230. Such requests by content management server 230 may be via network 202 or any other direct connection between search server 212 and content management server 230. In some implementations, search server 212 may exist as a stand-alone unit, as illustrated in FIG. 2, or may be a component integrated or housed within content management server 230.

Client device 206 may also submit search requests 218 to search server 212 for multimedia content 216 (e.g., video, film), rather than for search results 222 (e.g., URL). Search server 212 may send search requests 218 to content management server 230, which in turn, queries the multimedia content storage 232 for the multimedia content (e.g., multimedia content 216) sought by client device 206. If the multimedia content is not found in multimedia content storage 232, content management server 230 may notify search server 212 that the multimedia content is not found or available for delivery to client device 206. Upon receiving the notification, search server 212 may instead query search index storage 214 to identify resources 208 that are relevant to or contain the requested multimedia content.

Client device 206 receives the search results 222 and renders the search results 222, for example, in the form of one or more web pages, for presentation to users. In response to the user selecting a link (e.g., URL) in a search result at a client device 206, the client device 206 requests the resource 208 referenced by the link. The website 204 hosting the resource 208 receives the request for the resource 208 from the client device 206 and provides the resource 208 to the requesting client device 206. The resource 208 may include multimedia content that may begin playing automatically once received by the client device 206.

Search requests 218 submitted during user sessions are stored in a data store such as a search log data storage 226. Selection data 228 specifying user actions taken in response to search results 222 provided are also stored in a data store such as the search log data storage 226. These actions can include whether a search result was selected by a user. In some implementations, location data specifying a locality of the user device that submitted the search query can also be stored in the search log data storage 226. The data stored in the search log data storage 226 can be used to map search queries 114 submitted during search sessions to resources 208 that were identified in search results 222 and the actions taken by users. In some implementations, the search log data storage 226 can be anonymized so that the privacy of users is protected. In other implementations, any identified user preferences or user interactions can be generalized (for example, generalized based on user demographics) rather than associated with a particular user. Encryption and obfuscation techniques can also be used to protect the privacy of users.

Figure 3A:
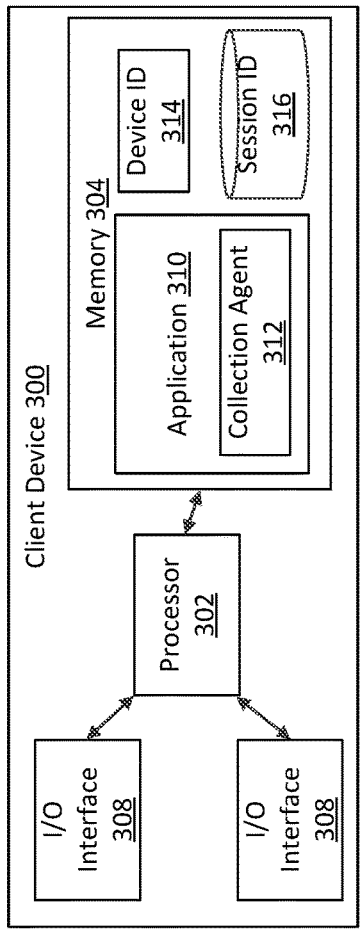
FIG. 3A is a block diagram of a client device, according to one implementation.

Illustrated in FIG. 3A is a block diagram of one implementation of a client device 300 of a client, such as client device 206. Client device 300 may be any number of different types of user electronic devices configured to communicate via a network, including without limitation, a laptop computer, a desktop computer, a tablet computer, a smartphone, a digital video recorder, a set-top box for a television, a video game console, or any other type and form of computing device or combinations of devices. In some implementations, the type of client device 300 may be categorized as a mobile device, a desktop device or a device intended to remain stationary or configured to primarily access a network via a local area network, or another category of electronic devices such as a media consumption device.

In many implementations, client device 300 includes a processor 302 and a memory 304. Memory 304 may store machine instructions that, when executed by processor 302 cause processor 302 to perform one or more of the operations described herein. Processor 302 may include a microprocessor, ASIC, FPGA, etc., or combinations thereof. In many implementations, processor 302 may be a multi-core processor or an array of processors. Memory 304 may include, but is not limited to, electronic, optical, magnetic, or any other storage devices capable of providing processor 302 with program instructions. Memory 304 may include a floppy disk, CD-ROM, DVD, magnetic disk, memory chip, ROM, RAM, EEPROM, EPROM, flash memory, optical media, or any other suitable memory from which processor 302 can read instructions. The instructions may include code from any suitable computer programming language such as, but not limited to, C, C++, C#, Java, JavaScript, Perl, HTML, XML, Python and Visual Basic.

Client device 300 may include one or more user interface devices 308. A network interface 306 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network or other computing devices. In many implementations, client device 300 may include a plurality of network interfaces 306 of different types, allowing for connections to a variety of networks, such as local area networks or wide area networks including the Internet, via different sub-networks.

Client device 300 may include one or more user interface or input/output devices 308. A user interface device 308 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 300, such as a built-in display, touch screen, microphone, etc., or external to the housing of client device 300, such as a monitor connected to client device 300, a speaker connected to client device 300, etc., according to various implementations.

Client device 300 include in memory 304 an application 310 or may execute an application 310 with a processor 302. Application 310 may be an application, applet, script, service, daemon, routine, or other executable logic for receiving content and for transmitting responses, commands, or other data. In one implementation, application 310 may be a web browser, while in another implementation, application 310 may be media presentation application. Application 310 may include functionality for displaying content received via network interface 306 and/or generated locally by processor 302, and for transmitting interactions received via a user interface device 308, such as requests for websites, selections of survey response options, input text strings, etc.

In some implementations, application 310 may include a collection agent 312. Collection agent 312 may include an application plug-in, application extension, subroutine, browser toolbar, daemon, or other executable logic for collecting data processed by application 310 and/or monitoring interactions of a user with an interface 308. In other implementations, collection agent 312 may be a separate application, service, daemon, routine, or other executable logic separate from application 310 but configured for intercepting and/or collecting data processed by application 310, such as a screen scraper, packet interceptor, API hooking process, or other such application.

Collection agent 312 may be configured for intercepting or receiving data input via user interface device 308, including mouse clicks, scroll wheel movements, gestures such as swipes, pinches, or touches, or any other such interactions; as well as data received and processed by application 310 including content displayed or media played, start time, end time, and duration of playback, as well as interactions with playback controls including pausing, resetting or restarting, fast forwarding, muting, or any other such interactions. Collection agent 312 may identify streamed multimedia content received by a client device, such as a television show, movie, song, music video, or other such content. Content may be identified based on identifier tags including ID3 tags or other such metadata, uniform resource locators (URLs) or uniform resource identifiers (URIs), filenames, captions, titles, or any other type and form of data accompanying the content. Collection agent 312 may identify or track playback or view time durations or cumulative playback times of multimedia content 216.

Client device 300 may include or be identified with a device identifier 314. Device identifiers 314 may include any type and form of identification, including without limitation a MAC address, text and/or numerical data string, a username, a cryptographic public key, cookies, device serial numbers, user profile data, network addresses, or any other such identifier that may be used to distinguish the client device 300 from other client devices 300. In some implementations, a device identifier 314 may be associated with one or more other device identifiers 314 (e.g., a device identifier for a mobile device, a device identifier for a home computer, etc.). In many implementations, to preserve privacy, the device identifier 314 may be cryptographically generated, encrypted, or otherwise obfuscated. In some implementations, client device 300 may include a session identifier 316, which may be similar to a device identifier 314 but generated more frequently, such as hourly, daily, upon activation of application 310, or any other such period. Session identifiers 316 may be generated by a client device 300 or received from a server, content provider, or other device. Session identifiers 316 may be used in place of device identifiers 314 to increase anonymity, or may be used in connection with device identifiers 314 to distinguish interactions of one session from those of another session. A session may include one or more keyword searches and each session may include a time and/or date record associated with each session.

Collection agent 312 may be configured to deliver device identifiers 314, session identifier 316, and any data collected by collection agent 312 to a search log data storage (e.g., search log data storage 226). The storing of copies such data in a search log data storage has the advantage of being available to a content management server (e.g., content management server 230) in the event that client device 300 is disconnected from the network (e.g., network 202), is transmitting or receiving data in a poor signal environment (e.g., fading), or is powered-down.

Figure 3B:
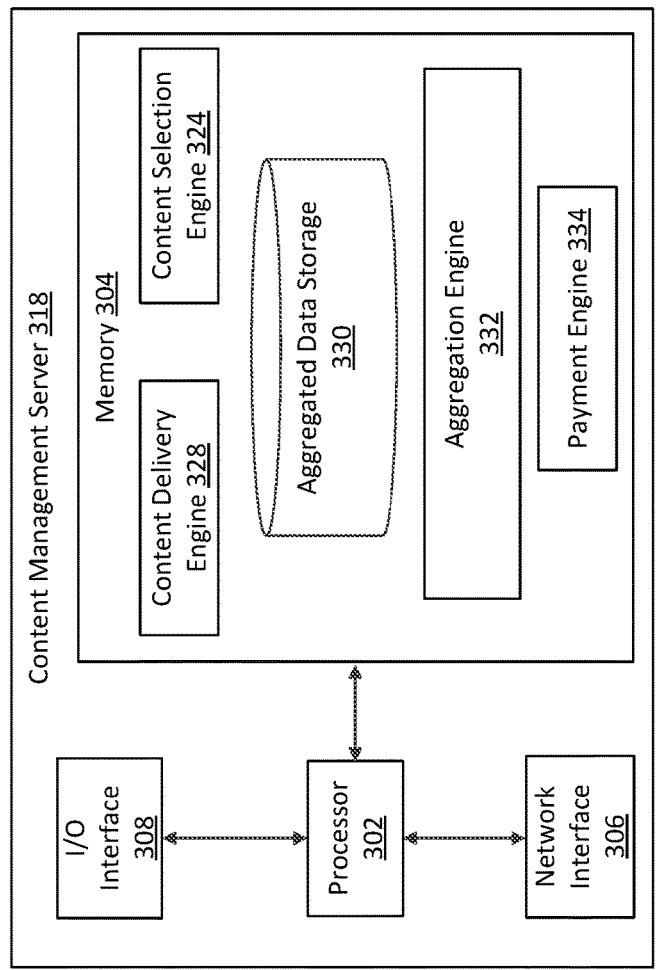
FIG. 3B is a block diagram of a content management server, according to one implementation.

Referring now to FIG. 3B, illustrated is a block diagram of an implementation of a content management server, such as content management server 318. As with client devices 300, content management server 318 may include one or more processors 302, memories 304, network interfaces 306, and user interfaces 308. In some implementations referred to as headless servers, a content management server 318 may not include a user interface 308, but may communicate with client devices 300 with user interfaces 308 via a network. Memory 204 may include aggregated data storage 330, which stores data processed by aggregation engine 332. In some implementations, memory 304 may store one or more applications 310 (not illustrated) for execution by processor 302 of the content management server 318, including FTP servers, web servers, mail servers, file sharing servers, peer to peer servers, or other such applications for delivering content stored in multimedia content storage 232 and sponsored content storage.

Content management server 318 may include a content selection engine 324. A content selection engine 324 may comprise an application, service, routine, server, daemon, or other executable logic for selecting content from multimedia content storage 232 or sponsored content storage responsive to a request from client device 300 comprising one or more identifiers. A request by a client device 300 for multimedia content (e.g., multimedia content 216) may include a device identifier (e.g., device identifier 314), session identifier (e.g., session identifier 316), request date and time, keyword, genre, type, creator, creation date, unwatched flag, or any other type and form of identification or characteristic. Content selection engine 324 may identify one or more items of multimedia content 216 in multimedia content storage 232 matching the characteristics or identifiers in the request, and may deliver the one or more items of multimedia content 216 to content delivery engine 328, to be delivered to client device 300. In some implementations, content selection engine 324 may limit the number of identified items of multimedia content, returning 10, 20, 50 or any other predetermined number of items.

Content selection engine 324 may also be configured to select one or more items of sponsored content (e.g., sponsored content 220), such as advertisements of products and services. The selected items may be delivered to content delivery engine 328 for delivery to client device 300. Content selection engine 324 may select an item of content from a database, such as sponsored content storage 234, based on one or more characteristics of the first item of content including genre, type, title, keywords, creator, creation date, or any other such information.

In some implementations, content selection engine 324 may select one or more items of sponsored content based on an aggregated score associated with the requested multimedia content. For example, in response to receiving a request from a client device for multimedia content (e.g., a movie), content selection engine 324 may deliver the request to aggregation engine 332. In response, aggregation engine 332 may return an identifier or a list of identifiers to sponsored content. In addition, the list may include an aggregated score for each item of sponsored content that represents the relevancy of the sponsored content to the multimedia content. For example, the list may be a string of ascii characters separated by a delimiting character such as a comma, underscore, space, hyphen, or any other delimiting symbol. An example string may appear as follows: Content ID_45, Content ID_55, Content ID_23, Content ID_41; where Content ID represents an identifier to a specific content item and the number that follows represents an aggregation score for a content item associated with the Content ID. From the returned list, content selection engine 324 may select the items of sponsored content with an aggregated scores equal to or above a threshold value. In some implementations, when the list includes more than one item of sponsored content satisfying the threshold value, content selection engine 324 may select one or more items of sponsored content from a database (e.g., sponsored content storage 234) to deliver to content delivery engine 328 based on a variety of methods, such as a random selection, a round robin selection, or any other selection process. In some implementations, content selection engine 324 may send the entire list to content delivery engine 328 for content delivery engine 328 to select the one or more sponsored content items from a database.

Content management server 318 may include a content delivery engine 328. A content delivery engine 328 may comprise an application, service, routine, server, daemon, or other executable logic for selecting content from multimedia content storage 232 or sponsored content storage responsive to a request from client device 300 comprising one or more identifiers. In some implementations, content delivery engine 328 may receive one or more items of content from content selection engine 324 and deliver to one or more client devices. In other implementations, content delivery engine 328 may receive a list of one or more content items from content selection engine 224 and deliver the list to one or more client devices. In other implementations, content delivery engine 328 will retrieve one or more content items found on the list from a database, such as multimedia content storage 232 or sponsored content storage 234, and deliver the one or more items to one or more client devices. In some implementations, content delivery engine 328 will insert computer code (e.g., C, C++, TCL, PERL, VBA, HTML, hyperscript, VBscript, flash, etc) into the one or more items of sponsored content that cause a browsers on the client device to navigate to a resource location coded into the sponsored content.

In other implementations, content delivery engine 328 may select an identifier of one or more sponsored content items from the list and use that identifier to retrieve the sponsored content item from sponsored content storage 234. In addition, content delivery engine 328 may insert the one or more sponsored content items into the multimedia content requested by a client device. For example, a client device may request a movie about a dog. In response to receiving the request, content selection engine 324 will retrieve the movie about the dog from multimedia content storage 232 and also retrieve an advertisement about dog bones from sponsored content storage 234. Content delivery engine 32 will may insert or embed the advertisement about dog bones into any time position within the movie about dogs, including at the beginning, at the end, at any time in-between the beginning and end, or immediately after the movie has ended. In addition, content delivery engine 328 may position the dog bone advertisement in any area on the client device, including any corner of the screen, in the middle of the screen, or any other area viewable by the user of the client device during playback of the video. multimedia content storage 232

Content management server 318 may include an aggregation engine 332. An aggregation engine 332 may comprise an application, service, routine, server, daemon, or other executable logic for selecting content from multimedia content storage 232 or sponsored content storage responsive to a request from client device 300 comprising one or more identifiers. In some implementations, aggregation engine 332 may aggregate search requests for the same keyword or phrase received from a plurality of client devices, and received at the same or similar moment in time in relation to the playback of a particular video. For instance, a client device may request a video on dogs and after starting the playback of the received video and waiting 5 minutes, send a request for search results using the keyword "puppies." A second client device that also requested the same video on dogs, may also send a search request using the same keyword "puppies" after 5 minutes of watching the video. In this example, aggregation engine 332 will aggregate or add each search count, such that the aggregated score will be 2. Any subsequent searches by other client devices for the same keyword and sent after 5 minutes of starting the playback for the same video on dogs will be aggregated with the stored aggregation score of 2. In some implementations, the search times do not have to be identical for aggregation engine 332 to aggregate the scores. For instance, aggregation engine 332 may apply a bin or binning to the raw data. For example, if bin is set to 2 minutes, then a search request performed after 4 minutes of watching the video on dogs may be aggregated with a search request from another client device performed after 5 minutes of watching the same video. Bin may be set to any time value, including seconds, minutes, hours, or days. In some implementations, aggregation engine 332 may use any algorithm to aggregate search requests that fall within the same bin.

In some implementations, a content management server 318 may execute a payment engine 334. Payment engine 334 may comprise an application, service, server, daemon, routine, or other executable logic for associating a creator, publisher, distributor, or sponsor of a first item of content with a paid second item of content inserted into a list responsive to a detected interaction with the first item of content. Payment engine 334 may provide revenue sharing from creators or publishers of paid content, such as advertising, to creators of popular first items of content that draw viewers, and/or indicate to a third-party payment system to provide payments and/or revenue sharing for such interactions. In some implementations, payment engine 334 may maintain a record or log of which items of content were inserted into and/or associated with a video, items of content that were interacted with, device identifiers of clients that interacted with the items, second items of content that were provided for inclusion in displayed lists, identifications of whether the second items of content were interacted with, etc. Payment engine 334 may compare durations of playback or viewing time to a monetization threshold to determine whether the item of content was viewed for a sufficient amount of time to charge the creator or publisher of paid content.

Figure 4:
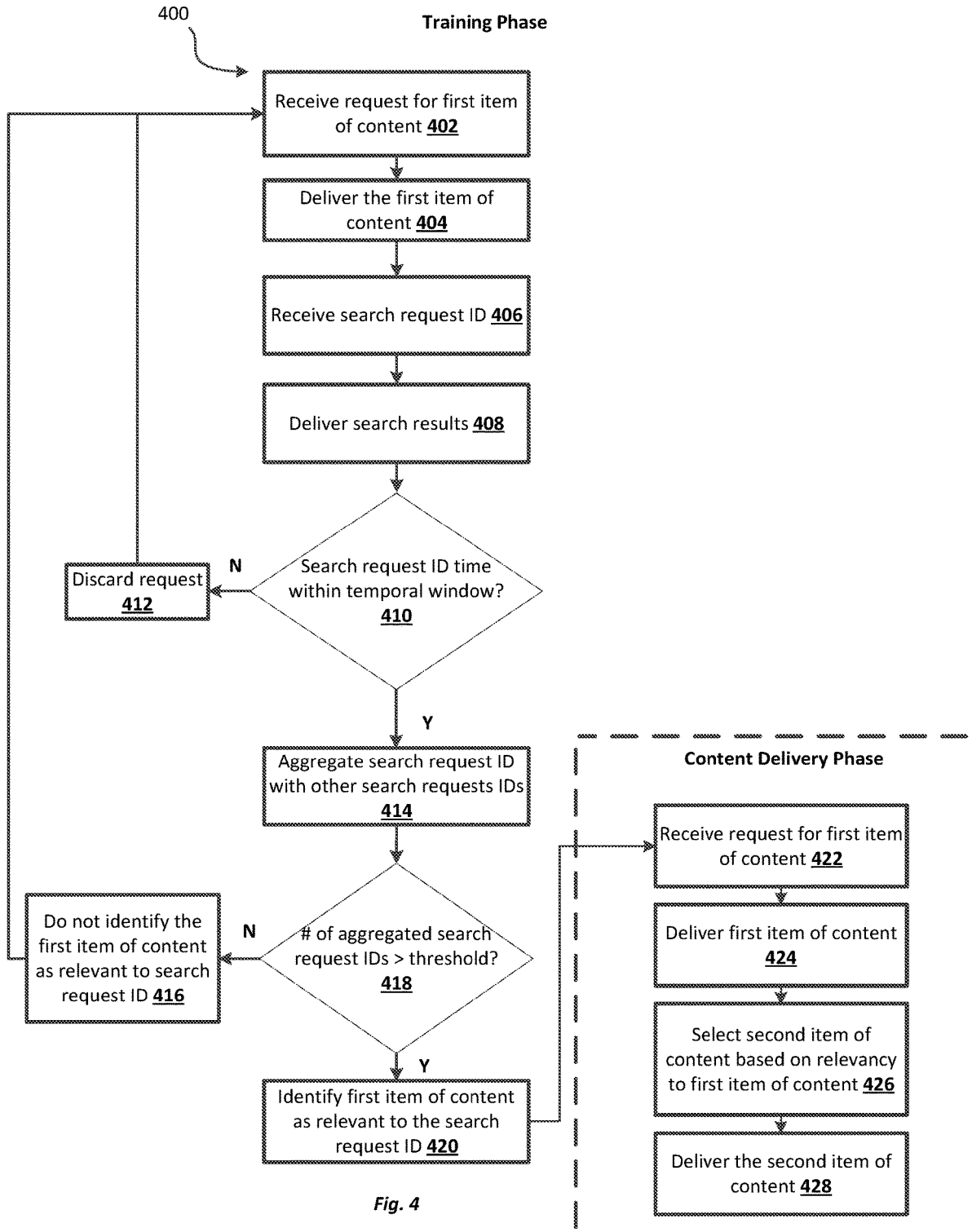
FIG. 4 is a flow diagram of the steps taken in one implementation of an example process for identifying, selecting, and delivering content relevant to the playback of a video.

FIG. 4 is a flow diagram of the steps taken in one implementation of an example process 400 for identifying, selecting, and delivering content relevant to the playback of a video. In some implementations, the process 400 may be performed by, for example, the content management server 318. The process 400 may include a training phase (steps 402-420) and a content delivery phase (steps 422-428). These steps may be re-ordered, added, or removed.

In the training phase of process 400, a request is received for a first item of content (step 402). The item of content may be any type of content including multimedia content (e.g., films, videos, cartoons, movies, streaming video) or sponsored content (advertisements in the form of pictures or multimedia). For example, a request may be received for a movie about a dinosaur or for a video that contains a series of movies or short clips concatenated together such as a movie on the animal kingdom, a movie about a musical, and a series of 30-second clips on computers. The multimedia content can be of any duration, such as in seconds, minutes, hours, or days. The requested items of content are delivered to one or more client devices (step 404). The items may be delivered through wired or wireless channels (infrared, Bluetooth, mobile communication channels). A search request, or the identification of a search request, is received in the form of a keyword or a phrase (step 406), from a client device playing the multimedia content. For example, the keyword "engine" or "tire" may be received, where the process retrieves search results that are associated or related to the keyword. Keywords or phrases may be relevant to search results based on subject matter, genre, category, aggregation score, or any other features of the content item. The retrieved search results are delivered to the requesting client device (step 408). A search result or request time is compared to a temporal window of time starting from playback or delivery of the first item of content (step 410), where search result or request times not within a temporal window of time from playback or delivery of the first item of content are discarded (step 412). For example, a client may start the playback of a video about "cats" at 8:00 p.m., may send an internet search request 10 minutes later, for a search results on "cats." If the temporal window is 11 minutes, then the results for the search request are delivered to the client device but subsequently discarded. Conversely, if the temporal window is 9 minutes, then the results for the search request (and the associated search ID) are aggregated with the search results (or associated search IDs) from other client devices viewing the same video on cats (step 414). The aggregate search request or aggregate score from a plurality of client devices are compared to a threshold value (step 418). The threshold value may be set to any integer or non-integer value, such as −10, 0, 1, 1.5, 5, 10, 100, 999. If the aggregated search results or aggregated score does not satisfy the threshold, then process 400 may not identify the requested item of content (e.g., multimedia content) as relevant to the search request ID. For example, 10 client devices may request the same video on "cats," and then follow with a search request for search results on cats no later than 10 minutes after starting the playback of the video on each client device. Process 400 may aggregate the scores of the 10 search requests and calculate a score of, for example, 50. If the threshold is 60, then the search request ID associated with cats will not be identified as relevant to the vide on cats (step 416). However, if the threshold is 40, then the search request ID associated with cats will be identified as relevant to the movie on cats (step 420). Timestamps for identifying playback times may be provided by the client device (e.g., from when a play button is clicked), or may be inferred based on timestamps of requests for blocks of streaming content.

Still referring to FIG. 4, in the content delivery phase 400, a request is received for a first item of content (step 422). The item of content may be any type of content including multimedia content (e.g., films, videos, cartoons, movies, streaming video) or sponsored content (advertisements in the form of pictures or multimedia. The multimedia content can be of any duration, such as in seconds, minutes, hours, or days. The requested items of content are delivered to one or more client devices (step 424). The items may be delivered through wired or wireless channels (infrared, Bluetooth, mobile communication channels). In some implementations, a second item of content, such as sponsored content, that is relevant to the first item of content may be selected (step 426) and then delivered to client device in addition to delivering the requested multimedia content (step 428). For example, a client device may request a movie for streaming playback, with a scene involving ice skating but unidentified in metadata of the movie. The server may retrieve the movie from a database containing multimedia content. In addition, the server may also determine, based on aggregated searches relating to ice skating from prior viewers of the movie or scene, that the content relates to ice skating, and may in response retrieve an advertisement on ice skating clothes from a database containing sponsored content, and deliver both the multimedia content and the sponsored content to client device. In some implementations, the selected relevant content may be inserted or embedded into the requested multimedia content prior to delivery to the requesting client device.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In many implementations, data collected about a user may be anonymized or disambiguated to protect privacy. In many implementations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to a content management server. In addition, certain data may be treated in one or more ways before it is stored or used by the content management server, so that personally identifiable information is removed when generating parameters (e.g., demographic parameters).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks can include various combinations of a local area network ("LAN"), a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). Client devices receiving content and providing relay pings, identifiers, or other data to an audience measurement service and/or panel provider may be smart television modules. The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for associating keywords to items of content based on search requests, comprising:

receiving, by one or more servers from a first client device, a first request for a first item of content;

maintaining, by the one or more servers and in a data storage, an association between the first item of content and keywords extracted from a plurality of Internet search requests transmitted by a plurality of second client devices within a predetermined temporal window of playback of the first item of content by the plurality of second client devices, wherein the keywords are extracted by:

identifying the plurality of second client devices on which the first item of content was presented;

identifying the plurality of Internet search requests performed by the plurality of second client devices within the predetermined temporal window of playback of the first item of content by the plurality of second client devices;

moving, by the one or more servers, the predetermined temporal window of playback farther in time to identify a second predetermined temporal window of playback;

identifying, by the one or more servers, a second plurality of Internet search requests performed by the plurality of second client devices within the second predetermined temporal window of playback of the first item of content by the plurality of second client devices;

aggregating, by the one or more servers, the second plurality of Internet search requests within the plurality of Internet search requests; and selecting the keywords from the plurality of Internet search requests based on a frequency of the keywords included in the plurality of Internet search requests.

2. The method of claim 1, further comprising:

calculating, by the one or more servers, a difference between a time that the first item of content was played by a second client device of the plurality of second client devices and a time that an Internet search request of the plurality of Internet search requests was performed by the second client device of the plurality of second client devices; and comparing, by the one or more servers, the difference to a predetermined threshold value to determine whether the Internet search request transmitted by the second client device of the plurality of second client devices occurred within the predetermined temporal window of playback.

3. The method of claim 1, further comprising:

aggregating, by the one or more servers, the plurality of Internet search requests transmitted by the plurality of second client devices within a plurality of predetermined temporal windows of playback of a plurality of respective items of content by the plurality of second client devices.

4. The method of claim 1, further comprising:

determining, by the one or more servers, that at least one of the plurality of Internet search requests comprises a search for a product.

5. The method of claim 1, wherein the first item of content comprises an advertisement for a product.

6. The method of claim 1, wherein at least one of the plurality of Internet search requests transmitted by a second client device of the plurality of second client devices within the predetermined temporal window of playback of the first item of content comprises an Internet search request transmitted by the second client device of the plurality of second client devices while the first item of content was played.

7. A system for associating keywords to items of content based on search requests, comprising:

one or more servers in communication with a data storage and with a plurality of second client devices, the one or more servers executing operations to:

receive, from a first client device, a first request for a first item of content;

maintain, in the data storage, an association between the first item of content and keywords extracted from a plurality of Internet search requests transmitted by the plurality of second client devices within a predetermined temporal window of playback of the first item of content by the plurality of second client devices, wherein the keywords are extracted by:

identifying the plurality of second client devices on which the first item of content was presented;

identifying the plurality of Internet search requests performed by the plurality of second client devices within the predetermined temporal window of playback of the first item of content by the plurality of second client devices;

move the predetermined temporal window of playback farther in time to identify a second predetermined temporal window of playback;

identify a second plurality of Internet search requests performed by the plurality of second client devices within the second predetermined temporal window of playback of the first item of content by the plurality of second client devices;

aggregate the second plurality of Internet search requests within the plurality of Internet search requests; and selecting the keywords from the plurality of Internet search requests based on a frequency of the keywords included in the plurality of Internet search requests.

8. The system of claim 7, wherein the one or more servers execute operations to:

calculate a difference between a time that the first item of content was played by a second client device of the plurality of second client devices and a time that an Internet search request of the plurality of Internet search requests was performed by the second client device of the plurality of second client devices; and compare the difference to a predetermined threshold value to determine whether the Internet search request transmitted by the second client device of the plurality of second client devices occurred within the predetermined temporal window of playback.

9. The system of claim 7, wherein the one or more servers execute operations to: determine that at least one of the plurality of Internet search requests comprises a search for a product.

10. The system of claim 7, wherein the first item of content comprises an advertisement for a product.

11. The system of claim 7, wherein the one or more servers execute operations to: aggregate the plurality of Internet search requests transmitted by the plurality of second client devices within a plurality of predetermined temporal windows of playback of the first item of content by the plurality of second client devices.

12. The system of claim 7, wherein the plurality of Internet search requests transmitted by a second client device of the plurality of second client devices within the predetermined temporal window of playback of the first item of content comprises an Internet search request transmitted by the second client device of the plurality of second client devices while the first item of content was played.

13. A non-transitory computer readable storage device storing instructions that, when executed by one or more processors, cause the one or more processors to perform operations comprising:

receiving, from a first client device, a first request for a first item of content;

identifying a plurality of second client devices on which the first item of content was presented;

identifying a plurality of Internet search requests performed by the plurality of second client devices within a predetermined temporal window of playback of the first item of content by the plurality of second client devices;

moving the predetermined temporal window of playback farther in time to identify a second predetermined temporal window of playback;

identifying a second plurality of Internet search requests performed by the plurality of second client devices within the second predetermined temporal window of playback of the first item of content by the plurality of second client devices;

aggregating the second plurality of Internet search requests within the plurality of Internet search requests;

extracting keywords from the plurality of Internet search requests based on a frequency of the keywords included in the plurality of Internet search requests; and maintaining, in a data storage, an association between the first item of content and the keywords extracted from the plurality of Internet search requests.

14. The non-transitory computer readable storage device of claim 13, wherein the instructions, when executed by the one or more processors, cause the one or more processors to perform operations further comprising:

calculating a difference between a time that the first item of content was played by a second client device of the plurality of second client devices and a time that an Internet search request of the plurality of Internet search requests was performed by the second client device of the plurality of second client devices; and comparing the difference to a predetermined threshold value to determine whether the Internet search request performed by the second client device of the plurality of second client devices occurred within the predetermined temporal window of playback.

15. The non-transitory computer readable storage device of claim 13, wherein the instructions, when executed by the one or more processors, cause the one or more processors to perform operations further comprising:

aggregating the plurality of Internet search requests performed by the plurality of second client devices within a plurality of predetermined temporal windows of playback of a plurality of respective items of content by the plurality of second client devices.

16. The non-transitory computer readable storage device of claim 13, wherein the instructions, when executed by the one or more processors, cause the one or more processors to perform operations further comprising:

determining that at least one of the plurality of Internet search requests comprises a search for a product.

17. The non-transitory computer readable storage device of claim 13, wherein the first item of content comprises an advertisement for a product.

* * * * *